(12) United States Patent
Wielage

(10) Patent No.: US 7,971,038 B2
(45) Date of Patent: Jun. 28, 2011

(54) ASYNCHRONOUS RIPPLE PIPELINE

(75) Inventor: Paul Wielage, Waalre (NL)

(73) Assignee: NXP B.V., Eindhoven (NL)

( * ) Notice: Subject to any disclaimer, the term of this patent is extended or adjusted under 35 U.S.C. 154(b) by 561 days.

(21) Appl. No.: 12/065,636

(22) PCT Filed: Sep. 4, 2006

(86) PCT No.: PCT/IB2006/053101
§ 371 (c)(1),
(2), (4) Date: Jun. 13, 2008

(87) PCT Pub. No.: WO2007/029168
PCT Pub. Date: Mar. 15, 2007

(65) Prior Publication Data
US 2008/0294879 A1    Nov. 27, 2008

(30) Foreign Application Priority Data
Sep. 5, 2005    (EP) .................................... 05108127

(51) Int. Cl.
*G06F 9/30*    (2006.01)
(52) U.S. Cl. .......................................... 712/225; 326/93
(58) Field of Classification Search .................. None
See application file for complete search history.

(56) References Cited

U.S. PATENT DOCUMENTS

| | | | |
|---|---|---|---|
| 3,117,307 A | 1/1964 | Davie | |
| 3,727,204 A | 4/1973 | De Koe | |
| 4,390,969 A * | 6/1983 | Hayes | 375/359 |
| 5,802,331 A * | 9/1998 | Van Berkel | 712/1 |
| 5,920,899 A * | 7/1999 | Chu | 711/169 |
| 6,038,656 A * | 3/2000 | Martin et al. | 712/211 |
| 6,067,109 A | 5/2000 | Yamana | |
| 6,212,566 B1 * | 4/2001 | Vanhoof et al. | 709/230 |
| 6,381,692 B1 * | 4/2002 | Martin et al. | 712/244 |
| 2004/0030858 A1 * | 2/2004 | Lines et al. | 712/11 |
| 2004/0046590 A1 * | 3/2004 | Singh et al. | 326/93 |
| 2007/0097771 A1 * | 5/2007 | Chu et al. | 365/221 |
| 2007/0113049 A1 * | 5/2007 | Timmermans | 712/200 |
| 2008/0164929 A1 * | 7/2008 | Kessels et al. | 327/261 |

FOREIGN PATENT DOCUMENTS
| | | |
|---|---|---|
| EP | 0644478 A2 | 3/1995 |
| EP | 0834802 A2 | 4/1998 |

OTHER PUBLICATIONS

Furber et al. (Furber) (Four-Phase Micropipeline Latch Control Circuits); This paper appears in: Very Large Scale Integration (VLSI) Systems, IEEE Transactions on; Issue Date: Jun. 1996; vol. 4 Issue:2; on pp. 247-253.*

(Continued)

*Primary Examiner* — Eddie P Chan
*Assistant Examiner* — Keith Vicary

(57) ABSTRACT

An asynchronous ripple pipeline has a plurality of stages, each with a controller (18) and a register (16). The controller has a register control output (21), and a combined acknowledgement and request output (20), together with a request input (22) and an acknowledgement input (24). The protocol used has a single signal, output on the combined acknowledgement and request output (20) of a stage (30), that functions both as a request to the next stage (32) and an acknowledgement to the previous stage (34).

7 Claims, 6 Drawing Sheets

OTHER PUBLICATIONS

Yun et al. (High-Performance Asynchronous Pipeline Circuits); This paper appears in: Advanced Research in Asynchronous Circuits and Systems, 1996. Proceedings., Second International Symposium on; Issue Date: Mar. 18-21, 1996; 12 pages.*

Endecott (SCALP: A Superscalar Asynchronous Low-Power Processor); Thesis submitted to the University of Manchester, Department of Computer Science, 2996, 217 pages.*

Lee et al. (A Low Latency Asynchronous FIFO Combining a Wave Pipeline with a Handshake Scheme); IEICE Transactions on Fundamentals of Electronics, Communications and Computer Sciences; vol. E88-A, Issue 4 (Apr. 2005); pp. 1031-1037.*

Pessolano et al. (Asynchronous First-in First-out Queues); Lecture Notes in Computer Science; vol. 1918; Proceedings of the 10th International Workshop on Integrated Circuit Design, Power and Timing Modeling, Optimization and Simulation; pp. 178-186; Year of Publication: 2000.*

Carlsson (Studies on Asynchronous Communication Ports for GALS Systems); Linkoping Studies in Science and Technology, Thesis No. 1163, Jun. 2005; 104 pages.*

Singh et al. (MOUSETRAP: Ultra-High-Speed Transition-Signaling Asynchronous Pipelines); This paper appears in: Computer Design, 2001. ICCD 2001. Proceedings. 2001 International Conference on; Issue Date: 2001; on pp. 9-17.*

Sutherland (Micropipelines); Communications of the ACM; vol. 32, Issue 6 (Jun. 1989); pp. 720-738.*

Wielage et al. (Design and DfT of a High-Speed Area-Efficient Embedded Asynchronous FIFO); Proceedings of the conference on Design, automation and test in Europe; pp. 853-858; Year of Publication: 2007.*

Peeters (Single-Rail Handshake Circuits); 1996; Thesis at Eidhoven University of Technology; 197 pages.*

Sutherland et al. (GasP: A Minimal FIFO Control); This paper appears in: Asynchronous Circuits and Systems, 2001. ASYNC 2001. Seventh International Symposium on; on pp. 46-53; Meeting Date: Mar. 11, 2001-Mar. 14, 2001.*

Kol et al. (A Doubly-Latched Asynchronous Pipeline); This paper appears in: Computer Design: VLSI in Computers and Processors, 1997. ICCD '97. Proceedings., 1997 IEEE International Conference on; Issue Date: Oct. 12-15, 1997; on pp. 706-711.*

Sretasereekul et al. (A Zero-Time-Overhead Asynchronous Four-Phase Controller); This paper appears in: Circuits and Systems, 2003. ISCAS '03. Proceedings of the 2003 International Symposium on; Issue Date: May 25-28, 2003; on pp. V-205-V-208 vol. 5.*

* cited by examiner

ASYNCHRONOUS RIPPLE PIPELINE

The invention relates to an asynchronous ripple pipeline and a method of controlling it.

A pipeline provides storage and frequently processing to a stream of data, and a basic implementation of a linear pipeline is illustrated in FIG. 1.

A number of sequential stages 10 each include storage 12 and processing may be carried out between the stages as indicated schematically as processor 14.

If the pipeline carries out no processing it is also known as a first-in-first-out (FIFO) memory device. If implemented as a linear pipeline, the architecture consists of identical stages connected in series where each stage is capable of storing one word of data.

A pipeline can be implemented using one of two approaches to timing, known as synchronous and asynchronous. Synchronous timing uses a global clock for transferring data between the successive stages of the pipeline. With a synchronous pipeline the propagation delay from input to output is equal to N clock cycles, where N is the number of stages of the pipeline, known as the depth.

An asynchronous pipeline does not have a global clock. Instead the data propagates between the successive stages by means of handshake signaling. As consequence of the asynchronous approach, data-tokens and holes ripple through the pipeline (FIFO) in a self-timed fashion. The input to output propagation delay is proportional to the number of stages N of the pipeline. Since the stage-to-stage ripple delay is between one and two orders of magnitude smaller than the clock period, asynchronous pipelines can have a better propagation delay.

An asynchronous pipeline also has the benefit that the input and output can run at different and/or varying clock speeds in the absence of a global clock.

A prior art implementation of a pipeline with processing is given in U.S. Pat. No. 6,067,109, which transmits instruction packets in one direction and results in the opposite direction. Logic is provided to prevent instruction packets and result packets bypassing one another by ensuring that instructions and results cannot be simultaneously released from adjacent stages. However, this implementation is relatively complex. The invention seeks to provide a simplified implementation of an asynchronous pipeline and a method for transferring data in such a pipeline.

In a first aspect, the invention relates to a method of data transfer between a stage and a next stage in a pipeline, having a data transfer line for transmitting data from the stage to the next stage, a request line for transmitting a request signal from the stage to the next stage indicating that the data-path holds valid data, and an acknowledgement line for transmitting an acknowledgement signal from the next stage to the stage that the next stage is occupied, the method comprising repeating the steps:

(i) waiting for both of two data-transfer conditions being true with either both the request signal and the acknowledgement signal asserted, or neither the request and acknowledgement signal asserted. wherein the first data-transfer condition is that the data-path holds valid data and the second data transfer condition is that the next stage is empty;

(ii) transferring data between the stages with the request signal asserted and the acknowledge signal de-asserted, and then asserting the acknowledgement signal;

(iii) with the request signal asserted and the acknowledgement signal asserted, promptly de-asserting the request signal;

(iv) waiting for one of the two data-transfer conditions to be satisfied with the acknowledgement signal asserted and the request signal de-asserted.

The method may include repeating steps (i) to (iv) to transfer items of data, wherein in at least one instance of step (i) both the request signal and the acknowledgement signal are asserted, and in at least one other instance of step (i) neither the request and acknowledgement signal are asserted.

The step of transferring data between the stages may process the data as it is transferred between the stages. In this case, the method may further include delaying the request signal transmitted from the stage to the next stage to allow time to carry out processing before the asserted request signal arrives at the next stage.

According to a second aspect of the invention there is provided a pipeline comprising:

a stage;

a next stage;

at least one data transfer line for transmitting data from the stage to the next stage;

a request line for transmitting a request signal from the stage to the next stage indicating that the data transfer line holds valid data; and an acknowledgement line for transmitting an acknowledgement signal from the next stage to the stage indicating that the next stage is occupied;

and a controller in the stages, the controllers being arranged to cooperate:

(i) to wait for the both of two data-transfer conditions to be true with either both the request signal and the acknowledgement signal asserted, or neither the request and acknowledgement signal asserted, wherein the first data-transfer condition is that the data-path holds valid data and the second data transfer condition is that the next stage is empty;

(ii) to transfer data down the data transfer line from the stage to the next stage with the request signal asserted and the acknowledge signal de-asserted, and then to assert the acknowledgement signal;

(iii) with the request signal asserted and the acknowledgement signal asserted, to de-assert the request signal; and (iv) to wait for one of the two data-transfer conditions to be satisfied with the acknowledgement signal asserted and the request signal de-asserted.

The invention provides a high speed, robust pipeline, that is particularly simple without losing functionality. This simplicity allows for implementation without difficulty and at relatively low cost.

The data line from the stage to the next stage may include a processing unit for processing data and the request line may include at least one delay component arranged to delay request signals transmitted from the stage to the next stage.

For a better understanding of the invention, embodiments will now be described, purely by way of example, with reference to the accompanying drawings, in which.

Note that the drawings are schematic and not to scale. The same or like components are given the same reference numerals in different Figures.

Figure 1:
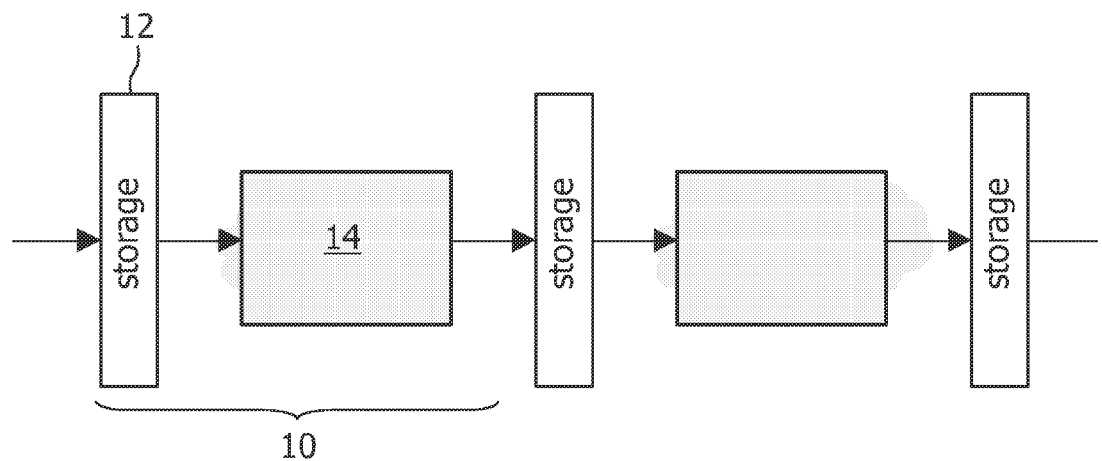
FIG. 1 shows a pipeline in schematic form.
Figure 2:
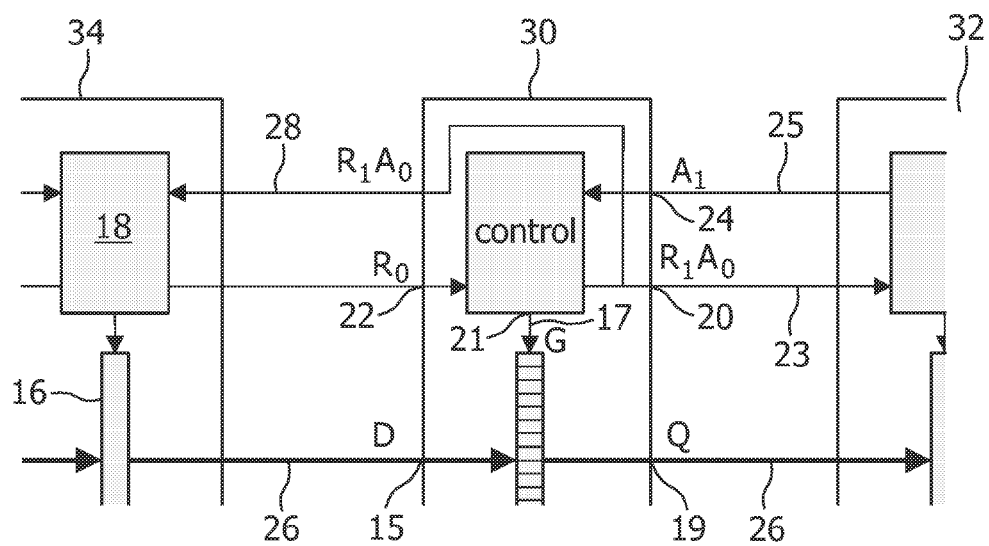
FIG. 2 shows a schematic of a first embodiment of the invention.

A block diagram of the ripple pipeline FIFO is provided in FIG. 1. Each of the stages 10 can hold one word in a register 16 built in the embodiment of latches and also includes a controller 18. The following discussion will focus on a single stage 30, and its interaction with the next stage 32 and the previous stage 34. It will be appreciated by those skilled in the art that in a real device there will be a variable number of stages, for example three to fifty, and that the first and last stages will be connected to other components.

Each stage has a single Acknowledge and Request output 20, and two control inputs, a request input 22 and an acknowledge input 24. These are connected to controller 18. Further, the controller has a register control output 21 which provides a register control signal "G" from the controller along an internal control line 17 to the register 16.

A data bus 26 provides data from the register 16 directly to the register of the next stage 32. The stage accordingly has a data input 15 and a data output 19, with register 16 between, though it should be noted that in the embodiment described the data input and output are nothing more than a physical connection to the data bus 26; each register 16 directly supplies the signal to the next stage.

Each pair of stages is connected through control lines 28, one of which is an acknowledgement line 25 for transmitting an acknowledgement signal backwards and one a request line 23 for transmitting a request signal forward. The Acknowledge and Request output is connected through request line 23 to the request input 22 of the next stage 32 and through acknowledgement line 25 to the acknowledge input 24 of the previous stage 34. In the same way, the acknowledge input 24 of the stage 30 under consideration is connected to the Acknowledge and Request output 20 of the next stage, and the request input 22 is connected to the Acknowledge and Request output 20 of the previous stage 34.

The control signals sent along control lines 28 are called request (R) and acknowledge (A). They form a handshake pair. A request is sent to the next stage when the data bus contains a valid data-token. When this data-token has been captured, an acknowledgement is sent back in the opposite direction. The request and acknowledge events are encoded by transitions on the handshake control signals, according to a 4-phase handshake protocol.

Two types of acknowledgement events exist: a rising transition on A which indicates that data has been copied to the next stage so that the next stage is full and a falling transition on A which means that the next stage is empty.

Thus, between each pair of adjacent stages request and acknowledgement signals are transmitted.

Notice that the acknowledgement back to the previous stage $A_0$ and the request to the next stage $R_1$ are implemented by a single output signal.

Although the described embodiment has a single combined request and acknowledgement output 20, it will in alternative embodiments often be convenient to have a pair of physical combined request and acknowledgement outputs on the stage 30, one connected to the next stage 32 and one to the previous stage 34, the two outputs being connected at controller 18 to a common driver.

Figure 3:
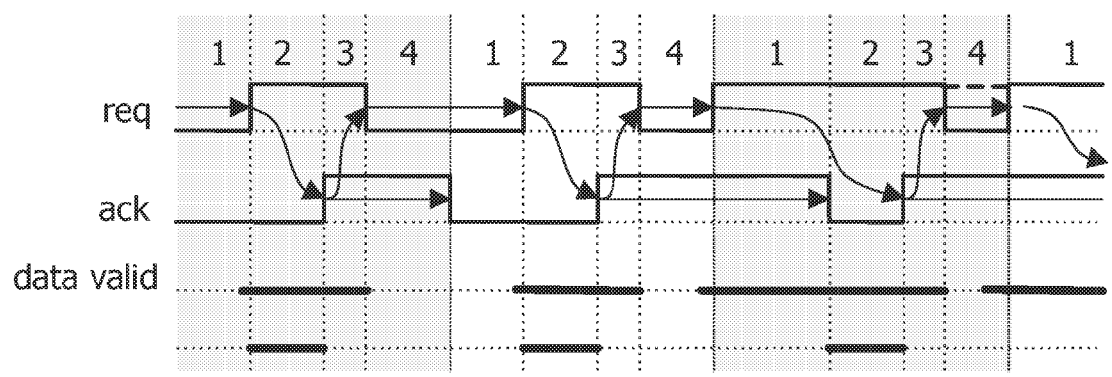
FIG. 3 is a timing diagram of the operation of the first embodiment.

In operation, a number of phases occur, as illustrated in FIG. 3. This shows the signals between a stage 30 and the next stage 32. The first wave form represents the signal R transmitted on the combined request and acknowledgement output 22 of the stage 30. The second graph indicates the signal input A received on the acknowledge input 24 of the stage, transmitted by the combined request and acknowledgement output 22 of the next stage. The third line indicates when data is valid on the data line between the stage and the next stage and the fourth line indicates when data is being transferred from the stage to the next stage. For compatibility with the discussion later, these signals will be referred to as $R_1$ and $A_1$ respectively.

A detailed description of the sequence of four phases is given below:

Phase 1:

For data transfer a joint condition must be fulfilled: (A) a data-token must be present on the data bus and (B) the latch of the next stage 32 must be empty such that it can record a token.

In a first phase 1 the channel is waiting for the second of these two elements. Thus, this first phase can occur if the next stage is empty but there is not yet a token present on the data bus from the previous stage. In this case the control present is $A_1=0$, $R_1=0$.

Alternatively, if the next stage is not ready to receive data, but a data token is present on the previous stage the signals in this phase are $R_1=1$, $A_1=1$.

Phase 2: This phase is initiated when the condition for data transfer is true $R_1=1$, $A_1=0$. Data is transferred from the stage 30 to the next stage. The stage ends after a little time for the stage to record data, when the next stage asserts its output signal on Acknowledge and Request output 20 $A_1=1$. By this time, the register 16 will have stored the data from the previous stage.

Phase 3: During this phase $R_1=1$, $A_1=1$. The receipt of the acknowledgement signal $A_1=1$ by the stage informs the stage that the data has been captured. The previous stage then stops asserting its request, giving rise to phase 4.

Phase 4 The encoding of this phase is $R_1=0$, $A_1=1$. The system waits in this phase for the first of the two conditions for transfer of data to apply.

One way phase 4 can end is for the next stage to become empty and in this case the acknowledgement signal is de-asserted $A_1=0$, ending phase 4 and returning to phase 1. In this case the channel in phase 1 is in the first of the two options ($R_1=0$, $A_1=0$).

Alternatively, phase 4 can end when a request is present again to transmit data to the stage 1 before an acknowledgement is received from the next stage ($R_1=1$, $A_1=1$). This corresponds to the second of the two cases for phase 1.

Phase 2 ends when an acknowledgement is sent back by the next stage $A_1=1$, and the stage under consideration de-asserts its output request immediately thereafter on receipt of this acknowledgement $R_1=0$, moving directly to phase 4 and the acceptance of the next data item.

This handshake protocol is not the same as the well-known 4-phase protocol, most often seen in asynchronous circuits. In particular the first phase is different since it has two possible encodings. Both are illustrated in FIG. 3—the first two transfers correspond to the first type of phase 1 but the last transfer corresponds to the second type.

Moreover, the combination $R=1$, $A=1$ can occur in both the first phase and the third phase.

The protocol is implemented by controllers in each stage. Note that various timing assumptions are required for correct implementation. Unlike a synchronous implementation, the timing is not controlled by a clock. In particular, it is important that all data is stable and valid before signals arrive to move the data on.

An alternative approach is illustrated by the dotted line in FIG. 3. In this alternative arrangement, the controller has an additional functionality. It determines in phase 3 whether data is already ready in the stage (30) and if so the controller puts that data on the line, and moves directly to a modified phase 1 without passing though phase 4. The modified phase 1 waits simply for the acknowledgement signal to indicate that the next stage (32) is empty before transferring data in phase 2. In the event that in phase 3 data is not already ready, the controller de-asserts the request and moves on to phase 4 as normal.

Figure 4:
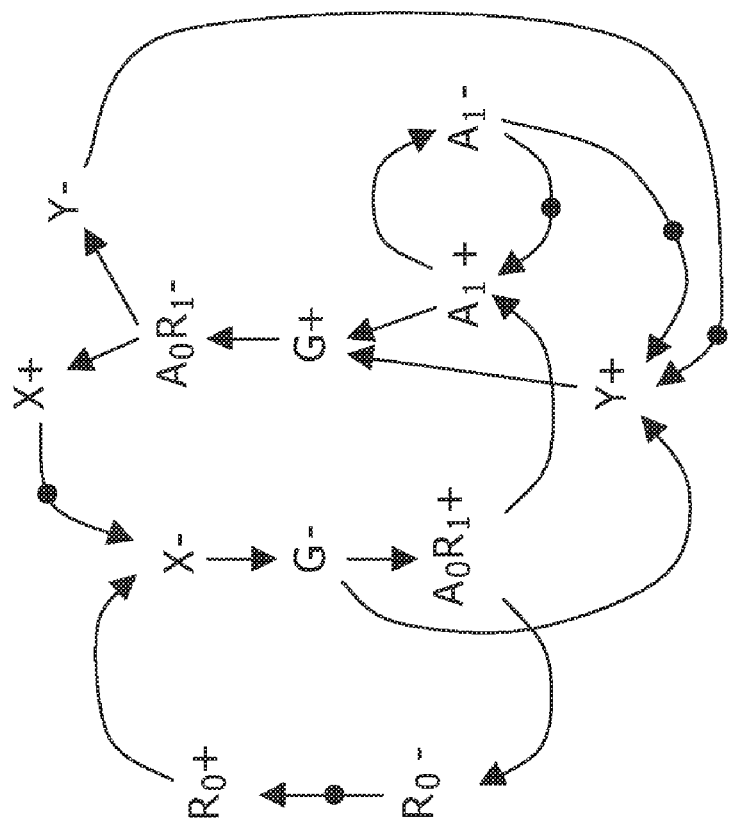
FIG. 4 is a signal transition diagram of the operation of the first embodiment.
Figure 4:
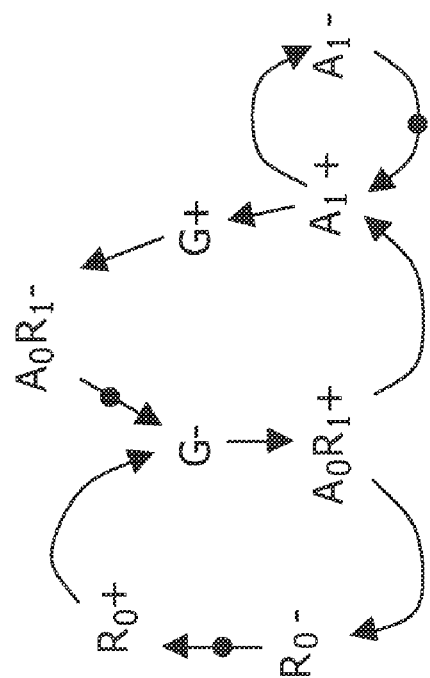

Returning to the embodiment without this alternative, each stage can be described by a finite state machine (FSM) that implements the control of the ripple pipeline stage. FIG. 4 shows the signal transition diagram (STG) and FIG. 5 the circuit implementation of controller 18 to implement the signal transitions.

It is important to consider the amount of coupling between the input and outputs of the stage. The speed of the pipeline can be improved by reducing the coupling, though it is important that the coupling is sufficient for the pipeline to function.

The register control signal G represents two states, a transparent state (G=1) and an opaque state (G=0). In the opaque state, a data token has been received from the previous state but not yet passed on, so the stage 30 is not available to receive new data. In the transparent state, the stage 30 is available to receive data. The stage automatically receives data present on its data input in the transparent state.

It might be thought that five signals would be needed for control, namely two handshake pairs, ($R_0$, $A_0$ and $R_1$, $A_1$) and register control signal G. The first handshake pair, ($R_0$, $A_0$) represents the request and acknowledge signals between the previous stage 34 and the stage under consideration 30, and the second handshake pair ($R_1$, $A_1$) represents the request and acknowledge signal between the stage under consideration 30 and the next stage 32.

However, because of the chosen channel protocol, the signals $A_0$ and $R_1$ can be implemented by just one signal, named $A_0R_1$. A request to the next stage is coupled to an acknowledgement to the previous stage. This simplifies the design of each stage.

The signal transition graph (STG) depicted in FIG. 4 specifies the required behavior of the stage controller 18. The operation aims to take data from its input port and tries to forward it, as soon as possible, to the next stage in the pipeline via its output port whereby the channels between the stages employ the aforementioned (modified) 4-phase handshake protocol.

In order to achieve rapid operation, the latch register of a stage is set transparent (G=1) when empty, so that data can be captured immediately it arrives. If and when a data-token arrives, the latches in the data-path need to be switched to the opaque (hold) mode.

The operation of the stage includes two internal state variables X and Y which keep track of the events at the input and output channels.

The encoding is as follows: if the stage is empty (ready to accept a data-token) variable X is high (X+). Note that in this description the bracketed signs are those of the right hand signal transition graph.

While waiting for a request, the request input signal is not asserted ($R_0$-). When a request arrives ($R_0$+), meaning the valid data is present at the input of the stage, X returns to zero (X-) causing the signal G to become opaque (G-) and a request/acknowledgement ($A_0R_1$+) is sent to the next and previous stages.

Variable Y is set high (Y+) when the next stage is empty, i.e. during the transfer of a token to the next stage. When the transfer has completed, which is signaled by an acknowledgement ($A_1$+) from the next stage, G is set (G+), the request/acknowledgement is reset ($A_0R_1$-), X is set (X+) and Y is reset (Y-). In this state with X asserted (X+) the FSM is ready to capture a token again when a request arrives from the previous stage ($R_0$+).

Figure 5:
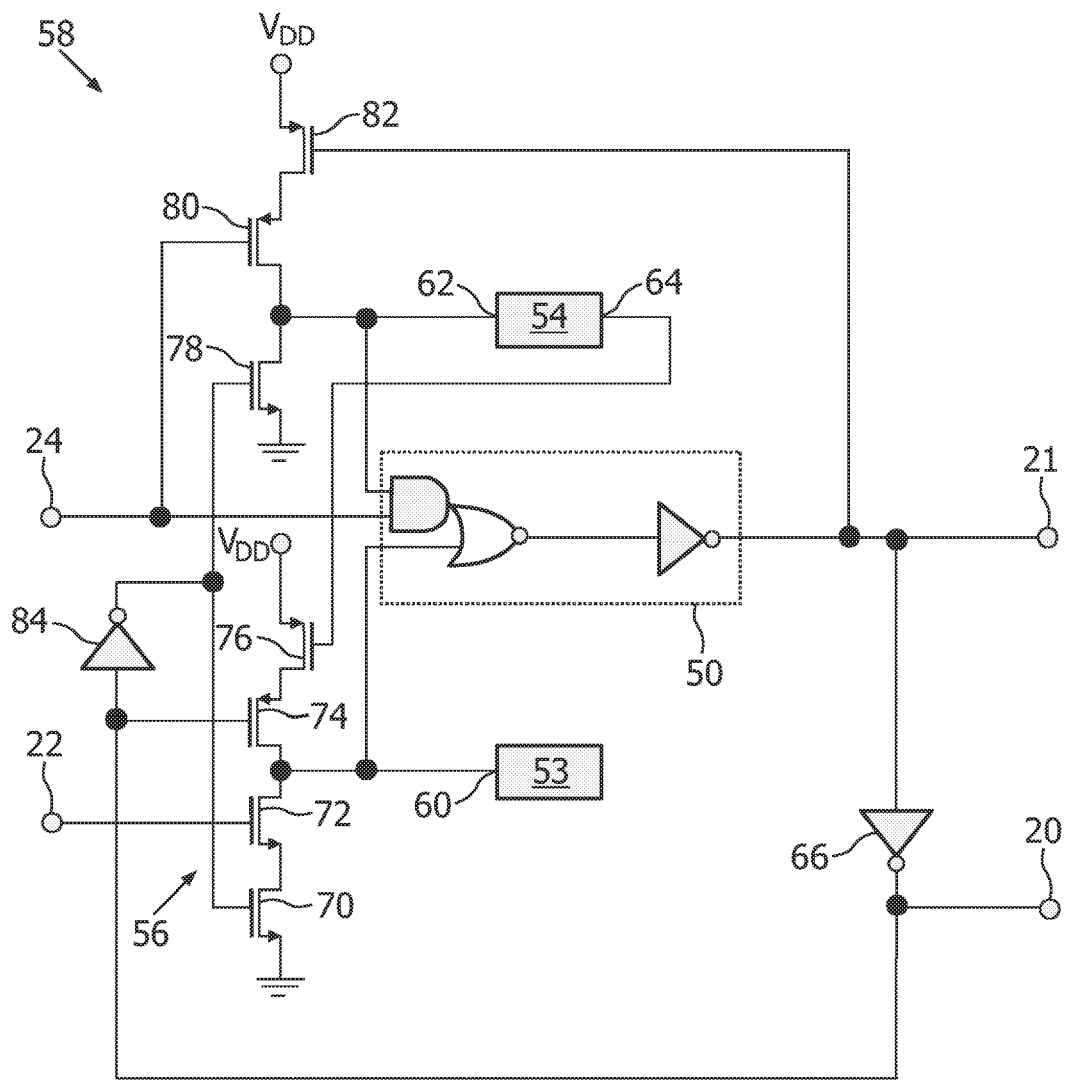
FIG. 5 illustrates a circuit implementing the control function in one stage of the first embodiment.

The circuit that implements the STG of FIG. 4 is shown in FIG. 5. The circuit has two inputs, request input 22 and acknowledge input 24, and two outputs, the combined request and acknowledge output 20 and the register control output 21.

At the centre of the circuit is an ANDOR gate 50, which combines signals corresponding to variables X and Y and the input $A_1$. As will be seen, in the embodiment the ANDOR gate 50 is implemented by a NOT ANDOR gate followed by an inverter.

The variables/signals X and Y are generated by set/reset state elements of transistor groups 56,58. In these groups, a P-branch sets the variable and N-branch resets it. A "bus-keeper" holds the signal stable if neither the P-branch nor the N-branch are active.

A first bus-keeper 53 holds its input/output terminal 60 constant unless it is changed by X-transistor group 56. The signal on input/output terminal 60 represents to the X signal. The first bus-keeper 53 in combination with the X-transistor group 56 constitutes a first (X) latch 52,56 the state of which is labeled X in the following.

In a similar way, second bus-keeper 54 has input/output terminal 62 which represents the Y signal. This is also held constant unless forced to change by operation of Y-transistor group 58. The second bus keeper also has an inverting output 64 which is connected to control one of the gates in the X-transistor group 56. The second bus-keeper 54 and Y-transistor group 58 constitute a second (Y) latch 54, 58, the state of which is labeled Y in the following.

The ANDOR gate 50 provides an AND operation on the signals from acknowledge input 24 and the Y latch, which is then NORed with the signal from the X latch, and inverted. The output of the central ANDOR gate 50 (including the inverter shown in series) accordingly corresponds to the signal ((A1 AND Y) OR X). This output is directly connected to register control output 21 to produce the register control signal G.

Thus, a change in the output on register control output 21 when an acknowledgement signal is received on acknowledgement input 24 is achieved directly by the combinatorial logic of the gate 50 without needing to change the internal state variables represented by latches X and Y. This ensures that the register control signal G is very promptly de-asserted. The inventors have realised that this is an important delay to speed up operation of the pipeline, as will be discussed in more detail below.

Inverter 66 has its input connected to the register control output 21 and its output connected to the combined request/acknowledge signal output 20 to invert the signal G to generate the combined request/acknowledge signal on output 20.

The circuit and operation of the latches is as follows.

The N-branch of the X-transistor group 56 includes a pair of N-type transistors 70, 72 connected in series. One of these has its base connected to the combined request/acknowledge signal at output 20 through inverter 84 and the other has its base connected directly to request input 22. This N-branch resets the X-signal on the X-bus keeper 53 if the request is asserted and the combined request/acknowledge signal is not asserted.

In a similar way, the P-branch of the X-transistor group 56 includes a pair of transistors 74,76. One has its base connected to the combined request/acknowledge signal at output 20 and the other to the inverting output 64 on the Y-bus keeper 54. Since the transistors are P-type they are switched on in the opposite conditions from the N-type transistors in the N-branch, i.e. if their inputs are low, and accordingly the transistors 74,76 set the X-signal at the X-bus keeper 53 if the Y signal is asserted and the combined request/acknowledge signal is not asserted.

The Y-transistor group 58 operates in a similar way. The N-branch (reset side) only contains one transistor 78 with its base connected to inverter 84 and hence resets the Y-signal on Y-bus keeper 54 if the combined request/acknowledge signal is not asserted.

The P-branch (set side) contains a pair of transistors 80,82, one of which has its base connected to acknowledge input 24 and the other of which has its base connected to the register control output 21, to set the Y signal if the register control output is not asserted together with the acknowledge input.

In use, any token present in the pipeline ripples automatically along the pipeline, until all words written into the pipeline can move no further because of existing words. Consequently all tokens group together at the output side of the pipeline. Reading a word from the output end of the pipeline results in rippling of an empty place into the direction of the write side. Hence in case of a filled FIFO, all words in the pipeline effectively shift one position into the direction of the output side.

Figure 6:
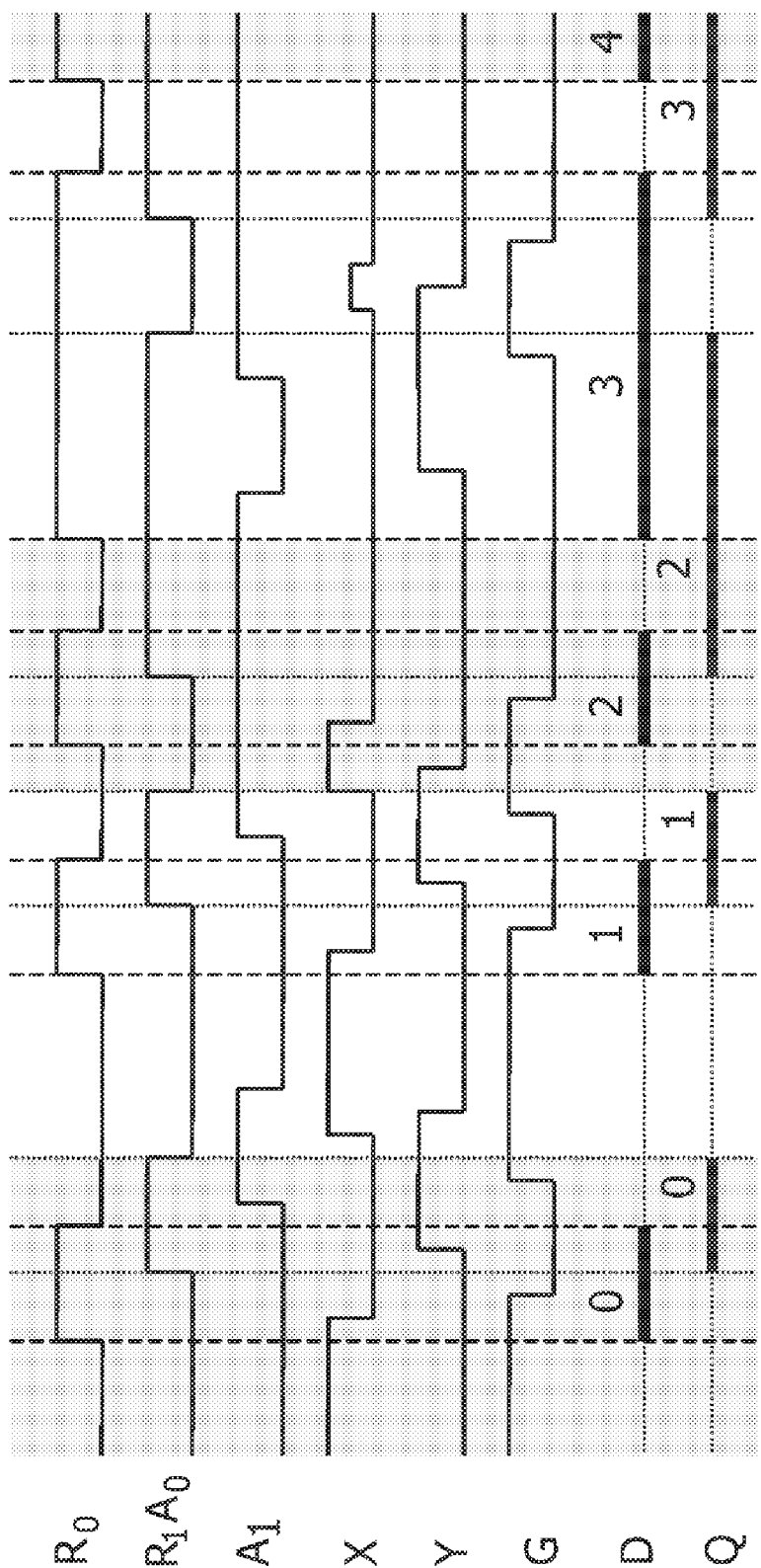
FIG. 6 illustrate the waveforms at various points within the circuit of FIG. 5 when operating a method according to the invention.

FIG. 6 shows the waveforms of the (internal) signals in case of four data-token transfers. The situation on the left corresponds to an empty FIFO, on the right it corresponds to an FIFO that has become full. The order of events in an empty and a full FIFO is described in more detail below respectively. The waveforms are labeled as above, together with a signal D which represents data being read by the stage (data present at input) and a signal Q which represents data present on the output bus 26.

Note that unlike FIG. 3, FIG. 6 takes account of the delays caused by finite response times of the various gates and inverters. The proposed embodiment provides sufficient delays to allow the register 16 to record and send signals. For example, at the start of phase 2 when data is being received, the circuit first changes variable X on the latch 52,56, this then changes G through ANDOR gate 50, and this then asserts the combined output $A_0R_1$ automatically through inverter 66 to indicate that the data has been received. The delay introduced by these steps is sufficient to ensure that the register stores the data presented to it, so the combined output $A_0R_1$ is in fact generated without any specific check that the data is indeed in the register.

Consider first the case of an empty pipeline. Initially the latch register 16 is empty, and so the register control signal controls the register 16 to be transparent (G=1), as the initial state. So in that case, any arriving data-token passes directly through the stage, as illustrated in the first transfer. After the data is present at the output, the register control signal G changes and so renders the register opaque (G=0), an acknowledgement is sent to the previous stage, and a request is sent to the next stage ($A_0R_1$=1).

When the next stage has accepted the data, it sends an acknowledgment back ($A_1$=1). As a result the register control signal G is set transparent again, and the request/acknowledgement is de-asserted ($A_0R_1$=0). Notice that X is de-asserted after data has entered the stage, and is asserted when it has been transferred to the next stage. Furthermore, Y is asserted after the next stage has been requested, and de-asserted when X has been asserted. To conclude, the request-to-request delay in the control path is given by the trace: $R_0+\to X-\to G-\to A_0R_1+$.

If a FIFO stage contains data, the register of that stage is put in the opaque mode (G=0) which functions as a hold mode.

The sequence of events will now be further discussed in the case that the pipeline is full, with all stages of the FIFO containing data. Reading a word in this case from the end of the pipeline causes an empty position to ripple from the back to the front. The waveforms at the right-hand side in FIG. 6 correspond with this situation.

The trace starts with a negative transition on $A_1$, which indicates an empty position in the next stage. As a result, Y is asserted. Since $A_0R_1$ was already asserted, data transfer to the next stage starts immediately. The transfer has finished when $A_1$ changes to a high level. Since Y is asserted, the positive transition of $A_1$ results in a rising level of G. Hence the stage starts to copy data from the previous stage (if present). During this transfer phase, $A_0R_1$ is low. The copy phase stops after a certain amount of time. The combinatorial path $G+\to A_0R_1-\to G-$ determines the duration of the transfer in this situation. Next $A_0R_1$ becomes high, which means a request to the next stage and an acknowledgement to the previous stage. As a result new data will be offered at the input of the stage ($R_0-\to R_0+$).

Notice that for the short period between $A_0R_1-\to Y-$ both the set-branch and the reset-branch of the X latch are simultaneously active. This is because valid data is already present ($R_0$=1) when the acknowledgement of the next stage arrives. As a result the variable X is asserted and immediately de-asserted.

To conclude, the acknowledge-to-acknowledge delay in the backward direction is given by the path: $A_1+\to G+\to A_0R_1-\to Y-\to G-\to A_0R_1+$ For proper operation of the FIFO delay matching between the control-path and the data-path is required. Fortunately, this requires only correct sizing of the transistors of an instance with a minimum number of bits. Any instance with a larger width (more bits per word) or a different depth (in words), is then functionally correct as well.

For delay matching, two ripple phenomena are important. The first one is the forward propagation of data through an empty FIFO, and the second one is the backward propagation of an empty place through a (partially) filled FIFO.

In the former (empty) situation, it is required that the propagation speed of the data bits through the latches in the data path should be faster than the stage-to-stage propagation speed of the request events. This delay constrained hold for the propagation through any number of stages (starting from the write side interface). The stage-to-stage propagation speed of request events in the control path is given by the transitions: $R_0+\to X-\to G-\to A_0R_1+$. The delay in the data-path is given by the propagation delay through the latch from D to Q, when the latch is being transparent. Adding extra delay in the request path (taking of course the direction of the transitions into account) allows increasing the amount of margin.

In the backward propagation case of a hole, the pulse width on the G signal needs to be sufficiently wide. During this pulse the latches in the data path must be able to capture new data. For more robustness one can prolong this pulse by downsizing the gate of the controller responsible for the negative edge of the G signal, i.e. the gate 84, particularly the transistor responsible for driving the rising edge of A0N. The involved signal transitions are: $G+\to A_0R_1-\to Y-\to G-$.

For proper operation two other timing constraints must be implemented.

The first constraint relates to the immediate clearance of a request after an acknowledgement. According to the protocol, a request must be de-asserted immediately after receiving the acknowledgement, otherwise the next controller will interpret the request as a new one, while it is still the previous one. The problem might especially occur in an empty FIFO, since the acknowledged token propagates immediately to the next stage, which makes the stage instantly ready to accept a new token. To verify the margin of this timing constraint, the delay between the request $R_0-$ and A0N+ in the case of an empty FIFO should be sufficiently large.

The second timing constraint is related to the assertion of Y. Variable Y is set when both $A_1$ and G are low and $A_0R_1$ is high. By the time signal $A_1$ becomes high (in responds to the request $A_0R_1+$) Y should be set. So the delay between Y+ and $A_1+$, which is most critical in an empty FIFO, needs to be sufficiently positive. Otherwise the controller will not react on the rising edge of $A_1$ (which indicates an acknowledgement) and a deadlock situation is the result.

Both of the first and second timing constraints can be achieved by selection of suitable transistor sizes.

It will be noted from FIG. 6 that the control operates in a particular sequence. Also, it will be noted that there is no control signal from the latch register 16 to the controller—the latch register is assumed to have received data when suitable conditions have been applied (G low and $R_0$ high).

In particular, a number of timing constraints are met by the implementation.

Firstly, at the start of the cycle, the data latch must not be closed before data is captured. This requires a certain delay between the second condition being met to start data transfer ($R_0=1$, $A_1=0$) and G becoming de-asserted. Secondly, the delay between starting data transfer into a stage ($R_0=1$, $A_1=0$) and asserting a request to the next stage ($A_0R_1=1$) needs to be sufficient for the data latch to assert the data on the next data line. Thirdly, for the implementation to work, Y must be set before an acknowledgement is received from the next stage ($A_1=1$). Fourthly, $R_0$ must have been de-asserted before the data token is passed on and the stage becomes empty.

It will be noted that data race through is inherently not possible because of the design $-A_0R_1=1$ is not asserted until G is already de-asserted.

These timing constraints are met by the implementation and ensure correct operation.

The implementation discussed has an advantage over current solutions: it is very high-speed, while still being robust. The latter is important for the fabrication yield. In the area of asynchronous pipelines, many solutions have been proposed in the past. It turned out that each of these solutions had shortfalls in the context of industrial application. The solution presented here is robust, simple and can be faster than any other known solution. In particular, the backward propagation, which is the most critical delay parameter of ripple FIFOs, is fast because the delay between receiving an acknowledgement from the next stage ($A_1+$) and changing the latch register from the opaque to the transparent mode (G+) is only one combinatorial gate delay (it does not require the change of a state variable).

There are a number of application areas for a FIFO pipeline as set out above. Firstly, the pipeline can be used as a basic building block of globally asynchronous locally synchronous (GALS) system on a chip. In such a system, FIFO pipelines according to the embodiment can link different domains on a chip with different clock signals. Another application is for clock domain crossing on a multi-frequency synchronous system on chip. The pipeline can also be used simply to store streaming data.

The skilled person will realise that pipelines with multiple stages can be built up from the stages described above. The first and last stages will need slight modification, as will be known to those skilled in the art, to provide suitable inputs and outputs.

The above description relates to an empty pipeline without processing. However, the invention is also applicable to the case where processing takes place on the pipeline.

Figure 7:
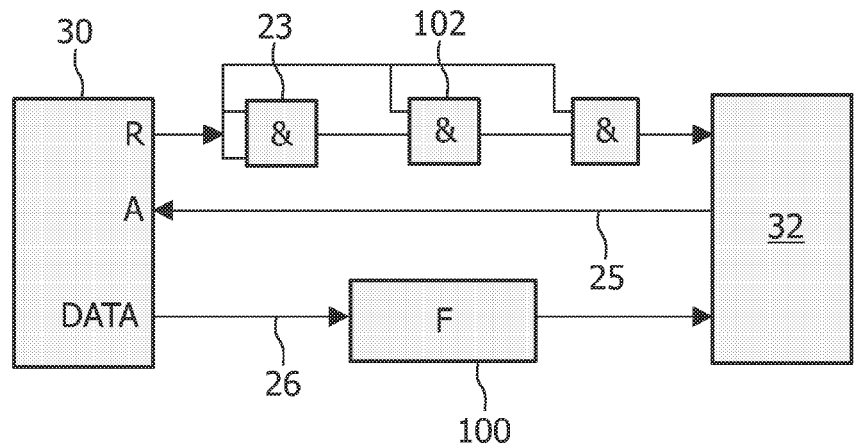
FIG. 7 illustrates a second embodiment of the invention in which processing is carried out in the pipeline.

FIG. 7 illustrates a pair of stages 30, 32 with a processing unit 100 on the data path between them. To allow time for the processing, a plurality of delay stages 102 are provided in the request line to delay the request signal. The delay stages each include a NOR gate with an inverter on one input, and take the request signal from the previous stage on that input and a signal from the acknowledge line on the other input. The output of each stage is connected to the request input of the next stage. The NOR gates are intended to delay the request signal R traveling from the stage 30 to the next stage 32, but to rapidly switch off the request signal R at each gate when an acknowledgement signal is transmitted back. In this way, the request signal is not asserted at the next stage until the data is processed and available at the next stage. The actual number of gates depends on the combinatorial delay of the processing unit. The propagation time through the delay gates must be more than the signal propagation delay through the processing unit.

Figure 8:
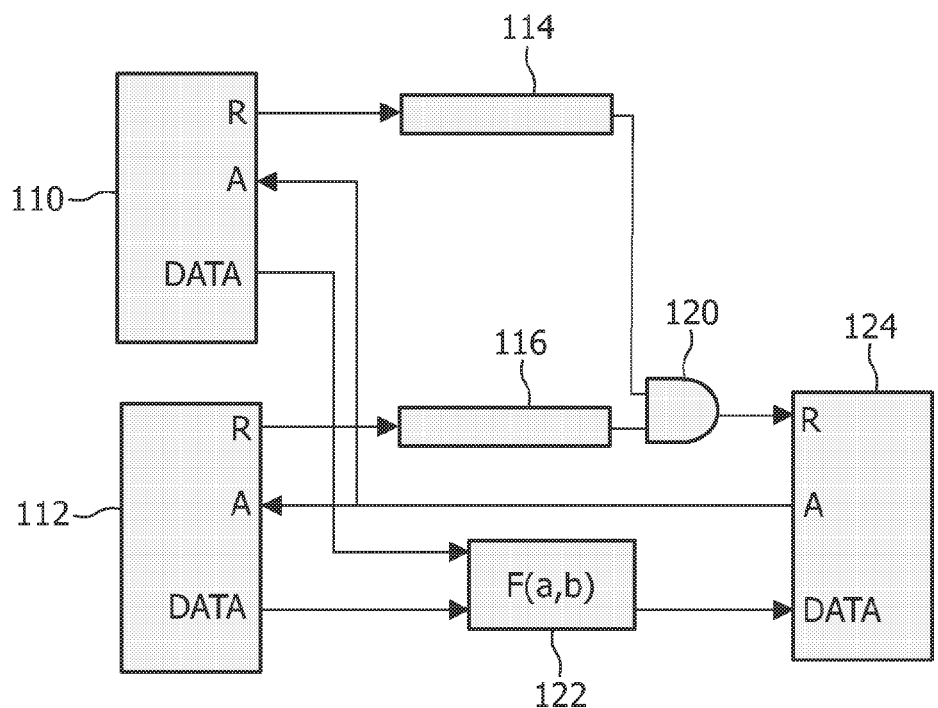
FIG. 8 illustrates a third embodiment of the invention in which processing is carried out in the pipeline that takes input from more than one stage.

FIG. 8 illustrates processing where the processing takes two operands from separate pipeline stages 110, 112. The data is combined in processing unit 122 and passed on to destination pipeline stage 124.

In order to deal with the handshaking, the request output of pipeline stage 110 is connected through delay line 114 to AND gate 120. The delay line 114 is made up of delay stages 102 as in the arrangement of FIG. 7. Similarly, the request output of stage 112 is passed through a separate delay line 116 to AND gate 120, which combines the requests from both stages 110, 112 and passes on the request signal to destination stage 124. Thus, the request signal is asserted at destination stage 124 with a delay after the request signals are asserted on both stages 110, 112 to allow time for processing unit 122 to process the data.

An acknowledgement signal line 25 is provided directly between the destination stage 124 and stages 110, 112. The skilled person will realise that modifications to the embodiments described above are possible. The invention can be implemented in any suitable way, including in particular implementing the invention as part of an integrated circuit.

The signals above are described with particular meanings ascribed to "1" and "0" signal levels. The skilled person will realise that different voltages can be ascribed different meanings, and for example the meanings of any or all of the signal lines can be reversed. Thus, for example, in alternative embodiments an acknowledgement signal can be asserted with a "0" signal instead of with a "1" signal.

The invention claimed is:

1. A pipeline comprising:
   a stage;
   a next stage;
   at least one data transfer line for transmitting data from the stage to the next stage;
   a request line for transmitting a request signal from the stage to the next stage indicating that the at least one data transfer line holds valid data; and an acknowledgement line for transmitting an acknowledgement signal from the next stage to the stage indicating that the next stage is occupied; and a controller in the stages, the controllers being arranged to cooperate:
- (i) to wait for both of two data-transfer conditions to be true with either both the request signal and the acknowledgement signal asserted, or neither the request and acknowledgement signal asserted, wherein the first data-transfer condition is that the data transfer line holds valid data and the second data-transfer condition is that the next stage is empty;
- (ii) to transfer data down the data transfer line from the stage to the next stage with the request signal asserted and the acknowledgement signal de-asserted, and then to assert the acknowledgement signal;
- (iii) with the request signal asserted and the acknowledgement signal asserted, to de-assert the request signal; and
- (iv) to wait for one of the two data-transfer conditions to be satisfied with the acknowledgement signal asserted and the request signal de-asserted;

wherein the stages include:
- a latch register;
- a data input for accepting a data item from the immediately preceding stage into the latch register;
- a data output for outputting a data item to the next stage from the latch register;
- an acknowledgement input for accepting an acknowledgement signal from the next stage confirming that a data item has been received;
- a request input for accepting a request signal from the previous stage indicating that the previous stage is ready to transmit a data item; and
- a combined request and acknowledgement output arranged to output a combined request signal to the request input of the next stage and an acknowledgement signal to the acknowledgement input of the previous stage to acknowledge receipt of a data item from the previous stage and to request transmission of the data item to the next stage;

wherein the controller includes:
- a first latch having set and reset states; and
- a second latch having set and reset states;

wherein the controller is arranged:
- to reset the first latch when a condition applies that the request signal on the request input is asserted and the combined request and acknowledgement signal on the combined request and acknowledgement output is de-asserted;
- to set the second latch when the acknowledgement signal received on the acknowledgement input from the next stage is not asserted and the condition applies;
- to set the first latch when the second latch is set and the combined request and acknowledgement signal is not asserted; and
- to reset the second latch when the combined request and acknowledgement signal is not asserted.

2. A pipeline according to claim 1 further comprising at least one logic gate, wherein the logic gate is an ANDOR gate with AND inputs connected to the second latch and to the acknowledgement input, and an OR input connected to the first latch, and an output connected to a register control signal output to output a register control signal in a first state when the AND inputs are both asserted or when the OR input is asserted.

3. A pipeline according to claim 2, further comprising an inverter having an input connected to the register control signal output and an output connected to the combined request and acknowledgement output for inverting the register control signal to provide the inverted register control signal on the combined request and acknowledgement output.

4. A pipeline according to claim 1, wherein the first latch includes:
- a first latch reset side circuit having inputs connected to the request input and to the combined request and acknowledgement output through an inverter to reset the first latch if the request input is asserted and the combined request and acknowledgement output is not asserted;
- a first latch set side circuit having inputs connected to the combined request and acknowledgement output and to an inverted output of the second latch to set the first latch if the combined request and acknowledgement output is not asserted and the second latch is asserted; and
- a first latch bus-keeper arranged to hold the output of the first latch if neither the first latch reset side circuit nor the first latch set side circuit operate.

5. A pipeline according to claim 1 wherein the second latch includes:
- a second latch reset side circuit having an input connected through an inverter to the combined request and acknowledgement output to reset the second latch if the combined request and acknowledgement output is not asserted;
- a second latch set side circuit having inputs connected to the acknowledgement input and to a register control signal output to set the second latch if the acknowledgement input signal is asserted and the register control signal output is asserted; and
- a second latch bus-keeper arranged to hold the output of the second latch if neither the second latch reset side circuit nor the second latch set side circuit operate.

6. A pipeline according to claim 1, wherein the data transfer line from the stage to the next stage includes a processing unit for processing data; and
the request line includes at least one delay component arranged to delay request signals transmitted from the stage to the next stage.

7. A pipeline according to claim 1 wherein the controller is arranged to determine whether data is available in the stage to be put on the at least one data transfer line before de-asserting the combined request and acknowledgement signal and if data is available in the stage to put the available data onto the data transfer line, to wait for the next stage to be empty and then to transfer data without needing to de-assert the request signal.

* * * * *